United States Patent [19]
Doster

[11] Patent Number: 6,028,691
[45] Date of Patent: Feb. 22, 2000

[54] MACHINE VISION

[75] Inventor: Rodney Doster, Garland, Tex.

[73] Assignee: Litton Systems, Inc., Woodland Hills, Calif.

[21] Appl. No.: 09/080,439

[22] Filed: May 18, 1998

[51] Int. Cl.⁷ .................................................. G02B 26/02
[52] U.S. Cl. ......................... 359/234; 359/230; 359/236; 359/900
[58] Field of Search ..................................... 359/230, 234, 359/236, 900, 232, 233, 368, 399, 656

[56] References Cited

U.S. PATENT DOCUMENTS

| | | | |
|---|---|---|---|
| 5,307,203 | 4/1994 | Hill | 359/236 |
| 5,351,152 | 9/1994 | Kuo et al. | 359/234 |
| 5,706,128 | 1/1998 | Greenberg | 359/234 |

*Primary Examiner*—James Phan

[57] ABSTRACT

A machine vision apparatus (24) and method are provided which allows imaging by or with the aid of artificial observation devices, such as video cameras, binoculars, telescopes, and other optical observation devices (10) which have an objective lens (12) passing light from an object or scene being viewed to a focal plane (18) at which is located a surface (22) which is at least partially reflective. Conventionally, such optical observation devices provide a retro-reflective light return into the scene being observed. Such a light return from an observation device can be detrimental, for example, to certain experimental results, or to the accuracy of machine vision (i.e., imaging) employed in robotic manufacturing tools.

15 Claims, 2 Drawing Sheets

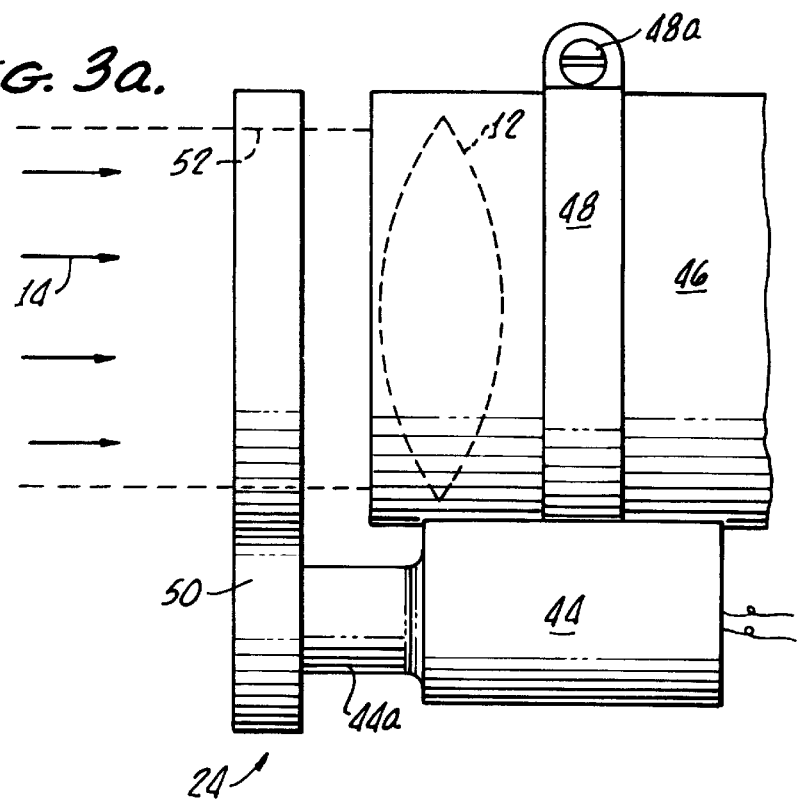
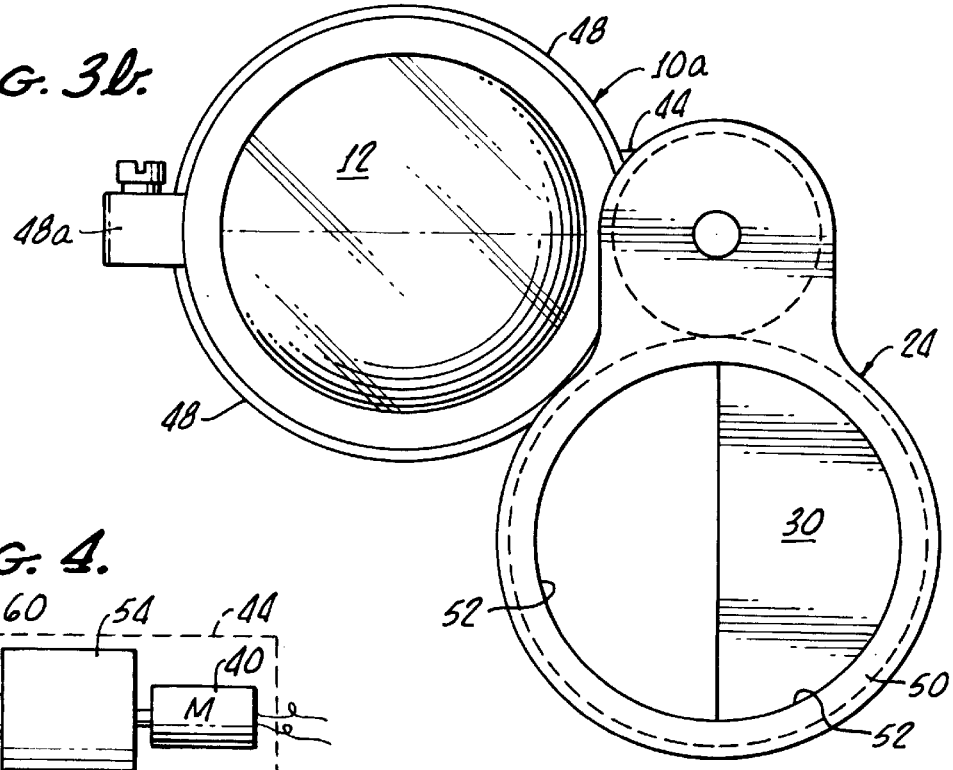
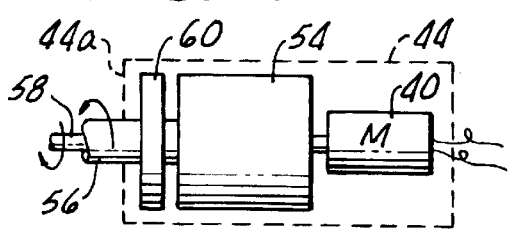

MACHINE VISION

BACKGROUND OF THE INVENTION

1. Field of the Invention

The present invention relates to machine vision. More particularly, this invention relates to imaging by artificial means (i.e., by or with the aid of man-made imaging devices) which have an objective lens receiving light and passing this light along an optical pathway to or through a focal plane at which is located a partially reflective surface. Accordingly, this invention relates to optical observation apparatus and methods in which an objective lens collects light and passes this light toward a focal plane at which is located a surface which is at least partially reflective.

2. Related Technology

Machine vision devices generally include an objective lens which receives light from an object or scene to be imaged, and which passes this light along an optical pathway to or through a focal plane. Some of these devices may have a light-responsive device, such as a CCD, disposed at the focal plane in order to respond electronically to the incident light. Thus, an electronic signal is created by the incident light, and can be used to create an image or may be recorded for later use in creating an image, or for display, for example. The artificial device, such as a CCD, disposed at the focal plane of the imaging device provides a surface which is at least partially reflective.

Alternatively, a man-made imaging device may have a reticule plate at the location of the focal plane, which provides a pattern focused at infinity, and which is seen by a human observer superimposed on the viewed object or scene when the device is used to bring light to the eye of the human observer. In such cases, both the reticule plate and the retina of the human observer may define surfaces which are at least partially reflective, and which are located at focal planes along the optical pathway of the device. Additionally, some artificial imaging devices may bring light to only a focal plan defined by the retina of a human user, and may not define any internal focal planes at which a surface which is at least partially reflective is disposed. Nevertheless, in such devices, the retina of the human observer when using such a device provides a surface located at a focal plane for light received via the device, and which is located at a focal plane for this light (even though the focal plane in not in such a case located within the device itself).

Examples of devices of the above-describe characters are seen in everyday experience. For example, the common VHS or 8 mm video camera has an objective lens and a CCD which defines a surface which is at least partially reflective and at a focal plane. A pair of binoculars when used by a human to observe a distant scene, or a microscope used to observe a close scene (i.e., one of small size in the case of the microscope) also has an objective lens and a surface which is at least partially reflective (i.e., the retina of the user), and which is located at a focal plane.

In each case explained above, and in other cases where an objective lens provides a focal plane, and a surface which is at least partially reflective is located at this focal plane, a common problem in artificial imaging, whether it be of the kind which provides an electronic signal for producing an image, or of the type which augments the natural human vision (such as a telescope, binocular, or microscope) is that at least some light is reflected from the partially reflective surface at the focal plane and returns outwardly of the device to the scene or object being viewed or imaged.

In some instances, it is very undesirable to have light reflected from an observing instrument returned to an object or scene being imaged or viewed. For example, in some chemistry experiments involving chemo-luminescence, a chemical reaction results in the production of light, and the quantity or time-rate of production of this light may provide an indication of the rate of the chemical reaction. Another example is provided by particle physics in which the light produced by particle interactions with one another or with an indicator medium is of importance in detecting the fact of or the nature of such particle interactions, or their path in a magnetic or electric field, for example. In such cases, and others, the reflection of light from an optical observation instrument back into the scene being viewed or back to an object being viewed can be very detrimental.

SUMMARY OF THE INVENTION

In view of the above, it is a primary object for this invention to provide an apparatus and method for preventing reflection of light from an optical observation instrument which includes an objective lens collecting light from a scene or object to be observed, and passing this light toward a focal plane at which is located a surface which is at least partially reflective.

Thus, according to one embodiment, this invention provides a method of improving imaging in an apparatus having an objective lens passing light from a scene to be imaged along an optical pathway to a focal plane at which is located a surface which is at least partially reflective, said method comprising steps of: providing an aperture plate having a segment-shaped aperture; disposing this aperture plate in said optical pathway generally perpendicular thereto; and rotating the aperture plate.

A better understanding of the present invention will be obtained from reading the following description of a single preferred exemplary embodiment of the present invention when taken in conjunction with the appended drawing Figures, in which the same features (or features analogous in structure or function) are indicated with the same reference numeral throughout the several views. It will be understood that the appended drawing Figures and description here following relate only to one or more exemplary preferred embodiments of the invention, and as such, are not to be taken as implying a limitation on the invention. No such limitation on the invention is implied, and none is to be inferred.

BRIEF DESCRIPTION OF THE DRAWING FIGURES

FIG. 1 provides a schematic depiction of an optical observation device embodying the present invention;

FIGS. 2a and 2b provide respective frontal and side elevation views, which are diagrammatic and fragmentary, as well as partially in cross section, of parts of a an optical observation device embodying the present invention;

FIGS. 3a, 3b, and 4 respectively provide a side elevation view, a frontal elevation view, and a diagrammatic cross sectional view, of an optical observation device embodying the present invention.

DETAILED DESCRIPTION OF AN EXEMPLARY PREFERRED EMBODIMENT OF THE INVENTION

Figure 1:
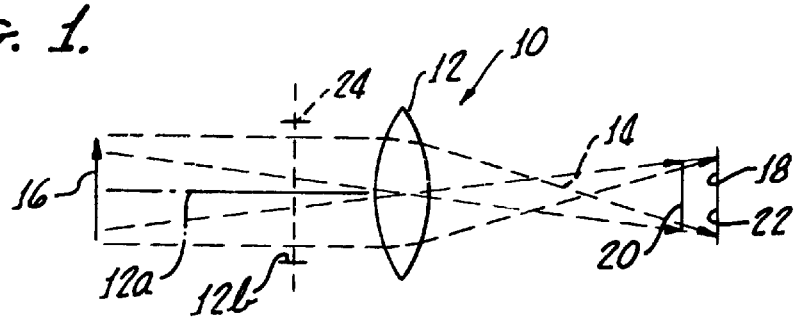

Viewing first FIG. 1, an optical observation device 10 is schematically illustrated. The observation device may take a wide variety of forms as will be better appreciated in view of the following. The device 10 includes an objective lens 12 by which light 14 from an object or scene (indicated by arrowed numeral 16) is received. The objective lens 12 defines an optical axis 12a for the device 10. The light 14 received via lens 12 is focused by this lens (or by this lens in cooperation with other lenses of the device 10 which are not illustrated) to a focal plane 18 at which a real image (indicated by arrowed numeral 20) of the scene 18 is created. Those ordinarily skilled in the pertinent arts will recognize that in various observation devices 10, at the focal plane 18 may be disposed a plane of photographic film, as in a camera. Other possibilities are a CCD at the plane 18, or a reticule plate which superimposes a reticule pattern on the real image of the scene created at the focal plane 18.

In many cases as explained above, the object at focal plane 18 will have a surface (indicated with numeral 22) which is at least partially reflective. Thus, conventionally, a portion of the light which enters objective lens 12 is reflected from the surface 22 and exits the objective lens 12 to be projected back to the object or scene 16 under observation. This retro-reflection of light from an object or scene is frequently undesirable. Accordingly, the device 10 includes a mechanism indicated by dashed line 24 in FIG. 1 which allows light 14 to enter the objective lens, but which substantially prevents all retro-reflection of light from the surface 22 back to the object or scene being observed. It is seen on FIG. 1, that at the location of mechanism 24, the light entering objective lens 12 along axis 12a may be considered to define an optical pathway 12b, which has a size about the same as that of the diameter of lens 12.

Figure 2A:
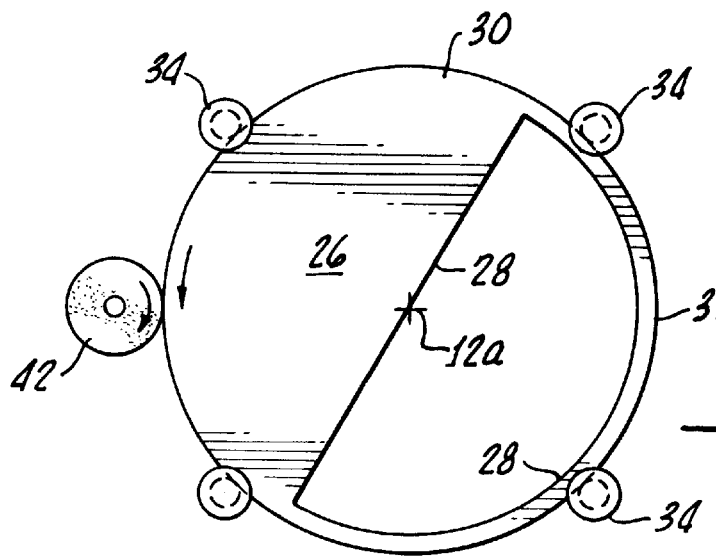
Figure 2B:
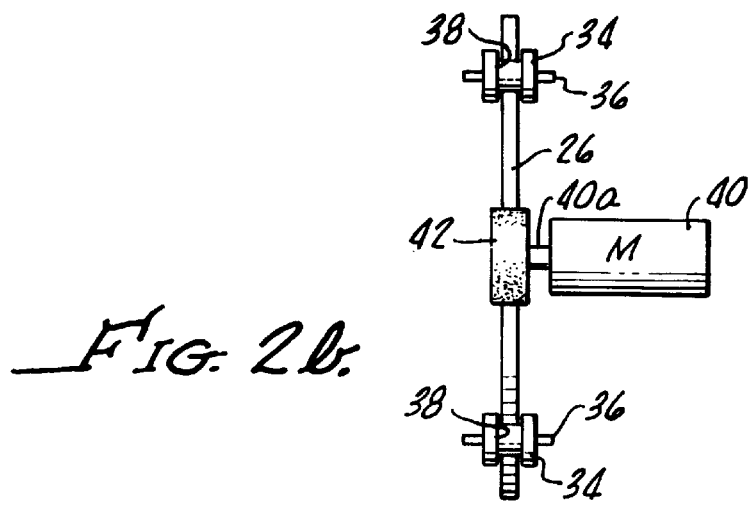

Considering now FIGS. 2a and 2b in combination, both Figures of which are diagrammatic or schematic in their representation of the mechanism 24, it is seen that this mechanism includes a circular aperture disk 26 which is disposed at the plane indicated by the dashed line 24 of FIG. 1 (i.e., perpendicularly to the optical axis 12a), and which has a sector-shaped opening 28. The sector-shaped opening 28 is half-circle shaped, and has an edge 28a extending across a diameter of the optical axis 12a. The opening 28 may be less than half a circle in its sector-shaped extent. However, as is seen in FIG. 2a, the opening 28 is preferably large enough that it essentially allows half of the optical pathway 12b to be open, and obstructs the other half of this pathway with a solid (i.e., opaque) portion 30 of the aperture disk 26. Circumscribing both the opening 28 and the solid portion 30 of this aperture disk 26 is a circular rim, indicated with numeral 32. This rim is embraced by four circumferentially evenly spaced apart guide rollers 34, each of which is journaled in the mechanism 24 by a respective axle 36. Viewing FIG. 2b, it is seen that the guide rollers 34 each define a circumferential groove 38 in which the rim 32 of the aperture disk 26 is received. Thus, it is to be understood that the aperture disk 26 is rotationally disposed in the optical pathway 12b, with the sector-shaped opening allowing light to pass along one half-circle shaped sector of this optical pathway, while the solid portion 30 of the aperture disk 26 blocks light from passing along the other diametrically opposite sector of the optical pathway.

In order to rotate the aperture disk 26 at a high enough speed that a human looking along the optical axis 12 (i.e., along pathway 12—the surface 22 may be defined by the retina of a human eye) will see a complete image, a motor 40 is provided, which on its output shaft 40a carries a resilient friction drive wheel 42. The resilient friction drive wheel 42 contacts the rim 32 of the aperture disk with sufficient engagement that the disk 26 spins when the motor 40 is powered.

Viewing now FIGS. 3a, 3b, and 4, it is seen that the optical observation device 10 might (as in this exemplary case), be configured as an optical telescope (indicated with numeral 10a), only the forward portion of which is depicted in FIGS. 3a and 3b. The forward portion of the telescope 10a houses an objective lens 12, and when the telescope is in use the eye of the human looking through it would provide a surface at a focal plane, which surface is at least partially reflective. In view of the above, it will be appreciated that the telescope 10 seen in FIGS. 3 would provide a retro-reflective return of light to the scene being viewed just as is described above. However, in order to prevent such a retro-reflective light return from the telescope 10 seen in FIGS. 3a and 3b, it is fitted with a mechanism 24 as described in FIGS. 2a and 2b. In this case, the mechanism 24 includes a housing 44 which nestles against the telescope body 46. This housing 44 is secured to the body 46 by use of a band clamp 48 having a clamp mechanism 48a providing for the band clamp 48 to be loosened and tightened by use of a screwdriver (not shown). Thus, it will be understood that in this exemplary embodiment, the device 24 can be installed on a standard telescope of other optical observation device, and is easily installed and removed from the observation device.

Returning to consideration of the mechanism 24, it is seen that the housing 44 includes a stem portion 44a, upon which is journaled a frame portion 50. The frame portion 50 is somewhat islet or teardrop shaped in frontal view, as is seen in FIG. 3b. The frame 50 defines a through aperture 52, seen best in FIG. 3b, and which is partially obstructed by the aperture plate 26. The frame portion 50 is hollow and also internally carries the four guide rollers 34, although these are not visible in FIG. 3b. Finally, it is to be noted that the frame portion 50 is pivotal between a first position seen in FIG. 3a in which the through aperture 52 is congruent with the optical pathway 12b leading to the lens 12, and a second position seen in FIG. 3b in which the frame 50 is pivoted completely clear of this optical pathway. As is seen in FIG. 3a, from the housing 44 exits an electrical cable connecting to a power supply (not shown in the drawing Figures) providing for operation of motor 40 in either direction of rotation.

Now turning to FIG. 4, it is seen that in this embodiment, the motor 40 is reversible, and has a drive shaft 40a driving into a direction-responsive gear box and clutch unit 54. This unit 54 is a speed reduction unit as well as having two output shafts, one of which (shaft 56) is hollow and is drivingly connected to the frame portion 50. The other output shaft 58 of the gear box 54 is internal of the shaft 56, and drivingly connect to a friction drive wheel 42, as was described above with respect to the diagrammatic illustrations of FIGS. 2a and 2b. Because the drive shaft 56 need only pivot about 90° in order to pivot the frame portion 50 between its first and second positions, the shaft 56 is associated with an annular limit stop and limit switch device 60. This device 60 provides for operation of motor 40 in a first direction, responsively pivoting the frame 50 (by rotation of shaft 56) from the second position of FIG. 3b to the first position of FIG. 3a (both of which are determined by physical limit stops within the device 60), after which the gearbox clutches the shaft 56 and frame 50 in this first position, and the motor 40 is maintained operating in this first direction to spin the aperture disk 26b by rotation of the shaft 58. Thus, the spinning aperture disk is disposed in its first position as seen in FIG. 3a, and the telescope or other optical observation device to which the mechanism 24 is attached is prevented from providing a retro-reflective light return into the scene being viewed. Because the disk 26 spins at a sufficiently high rate, the user of the telescope will experience a slight darkening of the viewed scene, but will be able to see the entire scene (not just half of it) essentially as though the scene were being viewed through a spinning fan or propeller.

On the other hand, when the motor 40 is operated in its second direction of rotation, the unit 54 pivots the shaft 56 and frame 50 in a second direction moving the frame from its first position of FIG. 3a to the second position of FIG. 3b. Upon reaching its second position, the shaft 56 is clutched in this position by unit 54, and in this case the limit switch function of the device 60 switches the motor 40 off. When the frame 50 is in this second position of FIG. 3b, the objective lens of the observation device is completely unobstructed. Thus, it is seen that by the simple expedient of providing a reversing switch interposed between a power supply for the motor 40 and this motor, a user of the mechanism 24 as depicted in FIGS. 3a, 3b, and 4 can have the observation device either completely protected against a retro-reflective light return into the scene being viewed (although this is at the cost of a slight decrease in image brightness), or can have the observation device perform in a completely normal way (but without protection against retro-reflective light return).

While the present invention has been depicted, described, and is defined by reference to a single particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. Thus, it is to be appreciated that although the aperture disk 26 of the depicted preferred embodiment includes a single segment-shaped aperture, the invention is not so limited. For example, while the depicted exemplary aperture disk 26 has a half-circle shaped aperture diametrically opposite to a half-circle shaped opaque portion of the aperture disk, a variety of other aperture configurations are equally usable. So long as each transparent section (i.e., aperture) of the aperture disk has a corresponding diametrically-opposite opaque section, then retro-reflection will be prevented in accord with the principles of the present invention. Accordingly, the depicted and described preferred embodiment of the invention is exemplary only, and is not exhaustive of the scope of the invention. Consequently, the invention is intended to be limited only by the spirit and scope of the appended claims, giving full cognizance to equivalents in all respects.

I claim:

1. A method of improving imaging by an imaging device having an objective lens passing light from a scene to be imaged along an optical pathway to a focal plane at which is located a surface which is at least partially reflective, said method comprising steps of:

providing a circular aperture plate having a circular segment-shaped aperture with a center at the center of said circular aperture plate;

disposing this aperture plate in said optical pathway generally perpendicular thereto; and rotating the aperture plate about an axis substantially perpendicular to the plate and located substantially at the center of the circular aperture plate.

2. The method of claim 1 further including the step of making said segment-shaped aperture half-circular in shape.

3. The method of claim 1 further including the step of rotating said aperture plate at a speed sufficient to allow a human observer to look through the aperture of the rotating aperture plate to see a complete image of the scene substantially without flicker or blurring.

4. The method of claim 3 including the step of using an electric motor to rotate said apertured plate.

5. A method of improving imaging by an imaging device having an objective lens passing light from a scene to be imaged along an optical pathway to a focal plane at which is located a surface which is at least partially reflective, said method comprising steps of:

providing an aperture plate having a segment-shaped aperture;

disposing this aperture plate in said optical pathway generally perpendicular thereto; and rotating the aperture plate;

further including the step of rotating said aperture plate at a speed sufficient to allow a human observer to look through the aperture of the rotating aperture plate to see a complete image of the scene substantially without flicker or blurring;

including the step of using an electric motor to rotate said apertured plate;

and further including the steps of:

providing a structure rotationally supporting said apertured plate in front of said objective lens; and providing for a portion of said structure carrying said apertured plate to selectively move the apertured plate away from in front of said objective lens.

6. The method of claim 5 further including the steps of:

operating said electric motor in a first direction of rotation in order to rotate said apertured plate; and operating the electric motor in an opposite direction of rotation in order to selectively move said portion of said structure which carries the apertured plate away from in front of said objective lens.

7. The method of claim 6 including the step of providing a clutch and speed reduction unit interposed in power transfer relation between said electric motor and both of said apertured plate and said portion of the structure which carries said apertured plate, and utilizing said clutch and speed reduction unit to selectively rotate the apertured plate when the motor operated in one direction, and to move the structure portion between a first position in which the apertured plate is in front of the objective lens and a second position in which the apertured plate is away from in front of the objective lens in response to operation of the electric motor in the opposite direction.

8. The method of claim 7 further including the steps of providing a power supply for said electric motor, and utilizing a switch reversing connection of the motor and said power supply in order to selectively control the direction of operation of the motor.

9. Apparatus for improved imaging in an imaging device having an objective lens passing light from a scene to be imaged along an optical pathway to a focal plane at which is located an at least partially reflective surface, said apparatus comprising:

an aperture plate having a segment-shaped aperture which is substantially half-circular in shape and a complementary opaque portion which is also substantially half-circular in shape and is diametrically opposite to the aperture;

structure for rotationally supporting said apertured plate in front of said objective lens so that the plate is rotational in a plane substantially perpendicular to the optical pathway; and drive means for rotating the aperture plate at a sufficient speed to allow the scene to be viewed through the aperture substantially without flicker or blur.

10. The apparatus of claim 9 including further an electric motor drivingly associated with and rotating said apertured plate.

11. The apparatus of claim 10 wherein said apertured plate includes a peripheral rim portion which circumscribes both said opaque portion and said aperture.

12. The apparatus of claim 11 further including a plurality of rotational guide and support wheels each having a circumferential groove about its perimeter, said guide and support wheels being spaced circumferentially apart about said apertured plate, and each of said guide and support wheels embracing said peripheral rim portion of the apertured plate in order to rotationally support the apertured plate.

13. The apparatus of claim 12 further including a support structure attaching to said device, said support structure in a first position rotationally supporting said apertured plate in front of said objective lens; and said support structure including a portion which is selectively movable to a second position in which said apertured plate is moved from in front of said objective lens.

14. The apparatus of claim 13 further including a clutch and speed reduction unit interposed in power transfer relation between said electric motor and both of said apertured plate and said portion of the structure which carries said apertured plate, said clutch and speed reduction unit selectively rotating the apertured plate when the motor operates in one direction, and moving the structure portion between a first position in which the apertured plate is in front of the objective lens and a second position in which the apertured plate is away from in front of the objective lens in response to operation of the electric motor in the opposite direction.

15. Apparatus for improved imaging in an imaging device having an objective lens passing light from a scene to be imaged along an optical pathway to a focal plane at which is located an at least partially reflective surface, said apparatus comprising:

an optical aperture plate having circumferentially alternating transparent or apertured segments interposed with complementary and diametrically opposite opaque portions of the plate; and structure for rotationally supporting said optical aperture plate in front of said objective lens so that the plate is rotational in a plane substantially perpendicular to the optical pathway and rotates at a speed sufficient to allow viewing the scene substantially without flicker or blur.

* * * * *